(12) United States Patent
Robinson et al.

(10) Patent No.: US 12,447,633 B2
(45) Date of Patent: Oct. 21, 2025

(54) HIGH SPEED MANIPULATION OF NON-UNIFORM OBJECTS

(71) Applicant: Emerging Acquisitions, LLC, Eugene, OR (US)

(72) Inventors: Derek Wayne Robinson, Marcola, OR (US); Kienan C. Brotherton, Eugene, OR (US)

(73) Assignee: Emerging Acquisitions, LLC, Eugene, OR (US)

( * ) Notice: Subject to any disclaimer, the term of this patent is extended or adjusted under 35 U.S.C. 154(b) by 0 days.

(21) Appl. No.: 18/657,573

(22) Filed: May 7, 2024

(65) Prior Publication Data

US 2024/0286296 A1    Aug. 29, 2024

Related U.S. Application Data

(62) Division of application No. 18/488,033, filed on Oct. 17, 2023, which is a division of application No.
(Continued)

(51) Int. Cl.
*B25J 15/06* (2006.01)
*B25J 15/00* (2006.01)
(Continued)

(52) U.S. Cl.
CPC ....... *B25J 15/0658* (2013.01); *B25J 15/0071* (2013.01); *B65B 35/56* (2013.01);
(Continued)

(58) Field of Classification Search
CPC .................. B25J 15/0683; B25J 15/0658; B25J 15/0071; B25J 15/0616; B65B 35/56; B65B 47/22
(Continued)

(56) References Cited

U.S. PATENT DOCUMENTS 2,604,351 A     7/1952   German et al.
3,005,652 A  *  10/1961  Helm ............... B66C 1/0231
                                                    294/189

(Continued)

OTHER PUBLICATIONS

Extended European Search Report for EP Application No. 18848509.8 dated Jun. 11, 2021, 12 pages.

(Continued)

*Primary Examiner* — Paul T Chin
(74) *Attorney, Agent, or Firm* — Stoel Rives LLP (57) ABSTRACT

System and methods for manipulating and sorting of objects being moved along a conveyor are disclosed, whereby control of the object is achieved through the application of one or more of vacuum, impaling, or mechanical grasping. One embodiment is directed to a robotic arm and vision detection system operable for detecting a target object to be grasped from a stream of objects being moved on a conveyor, and moving a suction head into position over the target object that has been detected on the conveyor, the suction head having a flexible cup section disposed at a distal end thereof, the vacuum item pick-up system/method using high subsonic air flow (e.g., on the order of 60 scfm or more) through a suction cup having a flow opening area large enough that an airflow of 60 scfm does not result in an airspeed exceeding Mach 0.2 under standard conditions of temperature and pressure, and further having a flow opening area whose ratio to cup opening area falls between 0.36 and 1.44 for applying a desired vacuum suction force for grasping the target object. Either as a primary grasping mechanism, or as an optional supplemental grasping mechanism, a piercing mechanism may be inserted into the object and used to manipulate the object in space. Alternate systems/methods for manipulating and sorting objects via hitting, flicking, or pushing are also disclosed.

20 Claims, 12 Drawing Sheets

Related U.S. Application Data

16/890,497, filed on Jun. 2, 2020, now Pat. No. 11,787,066, which is a division of application No. 15/946,627, filed on Apr. 5, 2018, now Pat. No. 10,668,630.

(60) Provisional application No. 62/548,817, filed on Aug. 22, 2017.

(51) Int. Cl.
  *B65B 35/36* (2006.01)
  *B65B 35/56* (2006.01)
  *B65G 47/22* (2006.01)
  *B65G 47/91* (2006.01)
  *B65H 29/32* (2006.01)

(52) U.S. Cl.
  CPC ............ *B65G 47/22* (2013.01); *B65G 47/91* (2013.01); *B65G 47/911* (2013.01); *B65G 47/917* (2013.01); *B65H 29/32* (2013.01); *B65H 2301/44514* (2013.01)

(58) Field of Classification Search
  USPC .................................................. 294/183, 188
  See application file for complete search history.

(56) References Cited

U.S. PATENT DOCUMENTS

| | | |
|---|---|---|
| 3,191,982 A | 6/1965 | Robert |
| 3,934,916 A | 1/1976 | Baker |
| 4,019,430 A | 4/1977 | Warren |
| 4,635,988 A | 1/1987 | Potters et al. |
| 4,681,063 A | 7/1987 | Hebrank |
| 4,723,353 A | 2/1988 | Monforte |
| 4,768,919 A | 9/1988 | Borgman et al. |
| 4,805,778 A | 2/1989 | Nambu |
| 5,054,831 A | 10/1991 | Ting et al. |
| 5,136,979 A | 8/1992 | Paul et al. |
| 5,344,202 A | 9/1994 | Ramler et al. |
| 5,365,693 A | 11/1994 | Van et al. |
| 5,421,685 A | 6/1995 | Elmer et al. |
| 5,800,256 A | 9/1998 | Bermudez |
| 5,868,238 A | 2/1999 | Bonnet |
| 6,131,973 A | 10/2000 | Trudeau et al. |
| 6,318,777 B1 | 11/2001 | Tanaka et al. |
| 6,343,415 B1 | 2/2002 | Okuda et al. |
| 6,514,018 B2 | 2/2003 | Martinez et al. |
| 6,860,531 B2 | 3/2005 | Sherwin |
| 6,971,838 B2 | 12/2005 | Johnson et al. |
| 6,979,032 B2 | 12/2005 | Damhuis |
| 7,000,311 B1 | 2/2006 | Reimann |
| 7,004,522 B2 | 2/2006 | Nagai et al. |
| 7,065,864 B2 | 6/2006 | Yamamoto et al. |
| 7,261,350 B2 | 8/2007 | Isetani et al. |
| 7,263,890 B2 | 9/2007 | Takahashi |
| 8,636,311 B2 * | 1/2014 | Herfert ................. B65G 47/91 294/185 |
| 9,527,682 B2 | 12/2016 | Endlicher |
| 10,668,630 B2 | 6/2020 | Robinson et al. |
| 11,554,505 B2 * | 1/2023 | Anderson ............ B25J 15/0683 |
| 2004/0094979 A1 | 5/2004 | Damhuis |
| 2010/0135760 A1 | 6/2010 | Hjornet |
| 2011/0254298 A1 | 10/2011 | Lomerson, Jr. et al. |
| 2015/0375401 A1 | 12/2015 | Dunkmann et al. |
| 2016/0059425 A1 | 3/2016 | Andersen |
| 2017/0355083 A1 | 12/2017 | Wigren et al. |

OTHER PUBLICATIONS

International Search Report and Written Opinion for International Application No. PCT/US2018/026563, mailed Sep. 17, 2018, 15 pages.

AMP Robotics, et al., AMP Robotics accounces a second recycling robot using artificial intelligence is being installed to recover food and beverage cartons, https://www.amprobotics.com/single-post/2017/08/29/AMP-Robotics-announces-a-secondrecycling-robot-using-artificial-intelligence-is-being-installed-to-recover-food-and-beverage ,2017 ,2.

AMP Robotics, et al., AMP Robotics Featured on CBS News, https://www.amprobotics.com/single-post/2017/05/19/AMP-Robotics-Featured-on-CBS-News , 2017 ,1.

Robotic Industries Association, et al., DURAFLEX® suction cups, https://www.robotics.org/product-catalog-detail.cfm?productid=3142 ,Jan. 20, 2011 ,2.

Shoup, Mary E. et al., Recycling robotics uses AI to sort food and beverage cartons from other materials, https://www.dairyreporter.com/Article/2017/03/31/Recycling-robotics-uses-AI-to-sort-cartons-from-othermaterials# ,Apr. 3, 2018 ,3.

* cited by examiner

HIGH SPEED MANIPULATION OF NON-UNIFORM OBJECTS

RELATED APPLICATION DATA

This application is a divisional of and claims the benefit under 35 U.S.C. § 121 of U.S. patent application Ser. No. 18/488,033 filed Oct. 17, 2023, which is a divisional of and claims the benefit under 35 U.S.C. § 121 of U.S. patent application Ser. No. 16/890,497 (now U.S. Pat. No. 11,787,066) filed Jun. 2, 2020, which is a divisional of and claims the benefit under 35 U.S.C. § 121 of U.S. patent application Ser. No. 15/946,627 (now U.S. Pat. No. 10,668,630) filed Apr. 5, 2018, which is a non-provisional of and claims the benefit under 35 U.S.C. § 119(e) of U.S. Provisional Patent Application No. 62/548,817 filed Aug. 22, 2017, the disclosures of which are incorporated by reference herein in their entireties.

BACKGROUND

The field of the present invention relates to a robotic system and robotic end-effector, and more particularly to one capable of high speed manipulation of objects with variable or undefined shape, structure, or size.

In the realm of robotic pick-and-place applications there has been a central focus on performing well-defined, repeatable tasks. This paradigm is fundamentally predictable and specific. Classical computation is adept at processing a precise list of instructions. As a result, technologies have been developed for a narrow range of applications allowing for the interaction with the real world. One such subset is robotic end-effectors for manipulation of objects. An example may be found in food handling applications. Although small variations may exist, the rules for any given operation tend to be very precise and the target object is well-defined. Pick-and-place grasping can be found in numerous industries, but commodity-based grasping is typically designed to leave no trace of handling. Applications exist where destructive methods of grasping can be utilized, one such field is waste handling.

Increases in computation power has led to the expansion of deep learning algorithms. In this paradigm the computer program is much more abstract and the inputs are no longer discrete, such as image recognition. Advancements in this field have numerous industrial applications. One such industry is recycling, the sorting of recycled materials. The nature of recycling is unpredictable with materials varying largely by region and have extreme variations even within that subset. The mechanical component of the robotic system is becoming a limiting factor of these robotic systems. The present inventors have recognized that similar to the shift in software, mechanical technologies need be developed to interact with objects of unpredictable size, shape, orientation, and composition.

SUMMARY

The embodiments described herein are directed to material handling systems, or more specifically, robotic arm sorting systems and methods of sorting, and in one embodiment to a robotic arm sorting system with grasping mechanism/end-effector design capable of reliably manipulating/grasping non-uniform objects. Even objects of indeterminate size, shape, orientation, and surface condition can be grasped and relocated in a given space. This grasping functionality need not be dependent to the specific grasping point chosen by the grasping mechanism. The system may be suitable when miscellaneous objects of indeterminate/varied shape and size are located in the vicinity of the target object and the working environment is not controlled for cleanliness, and/or where the preservation of the object's condition is irrelevant.

DETAILED DESCRIPTION

Certain embodiments will now be described with reference to the drawings. To facilitate description, any element numeral representing an element in one figure will represent the same element in any other figure. It is noted that embodiments of the grabbing/end-effector mechanisms will be described with reference to a particular robotic arm system, but it will be appreciated that details of the described mechanisms may be applied in other any robotic arm systems or the like.

Figure 1:
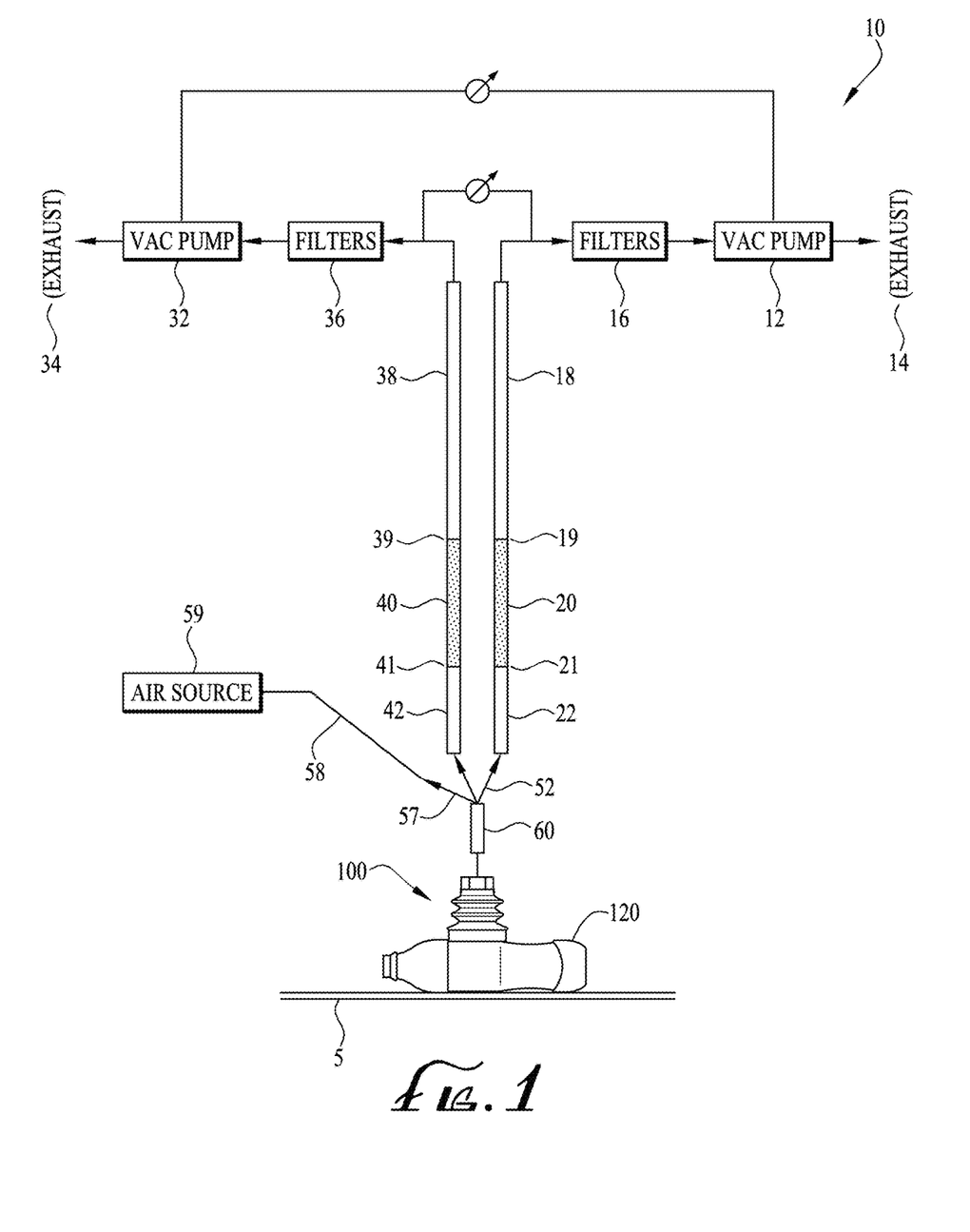
FIG. 1 is a schematic of a vacuum sorting system according to an embodiment, and including a front elevation view of a suction cup embodiment positioned to manipulate a target object.
Figure 2:
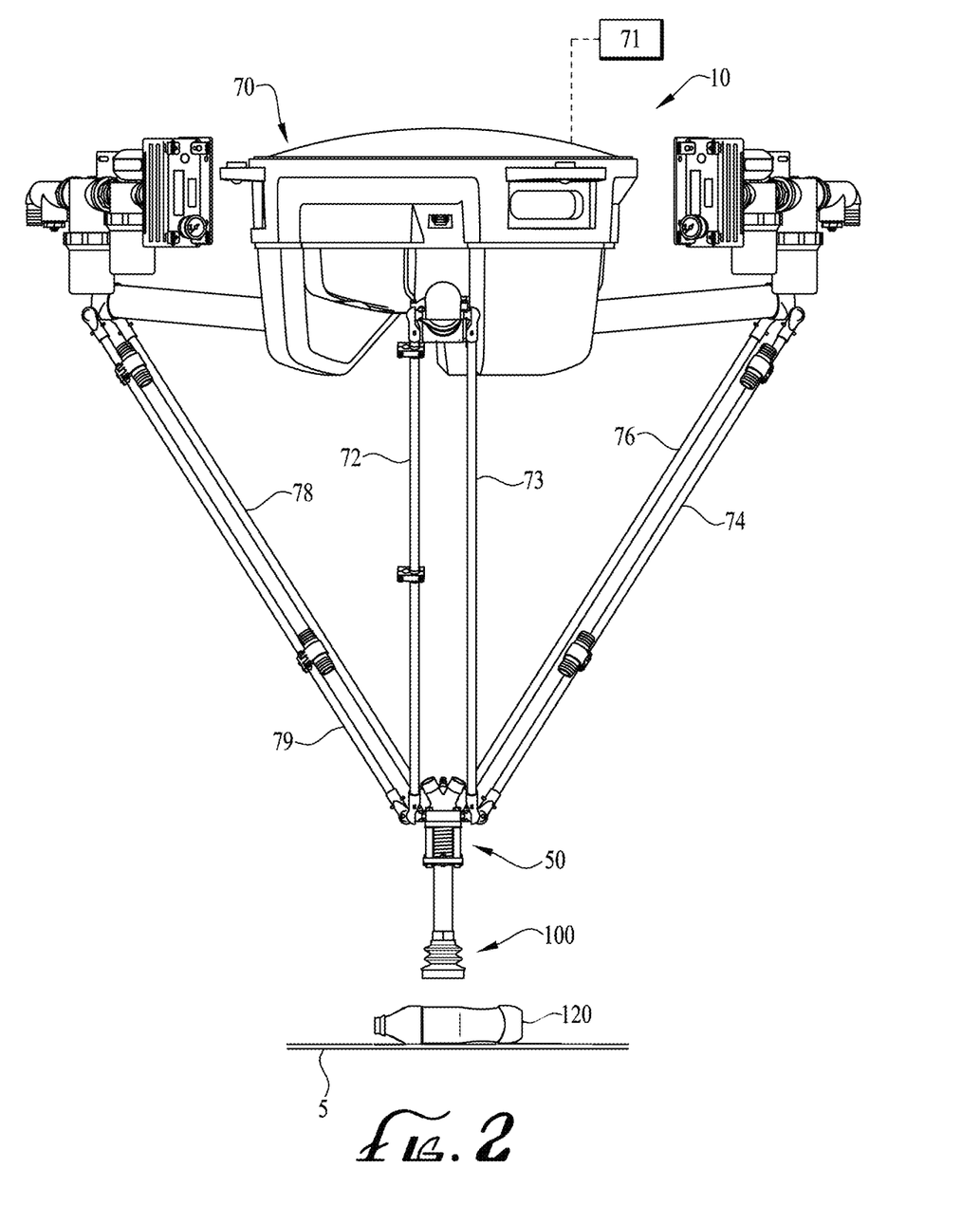
FIG. 2 is a front isometric view of an example robotic arm and vacuum head section of the sorting system of FIG. 1 according to an embodiment.
Figure 3:
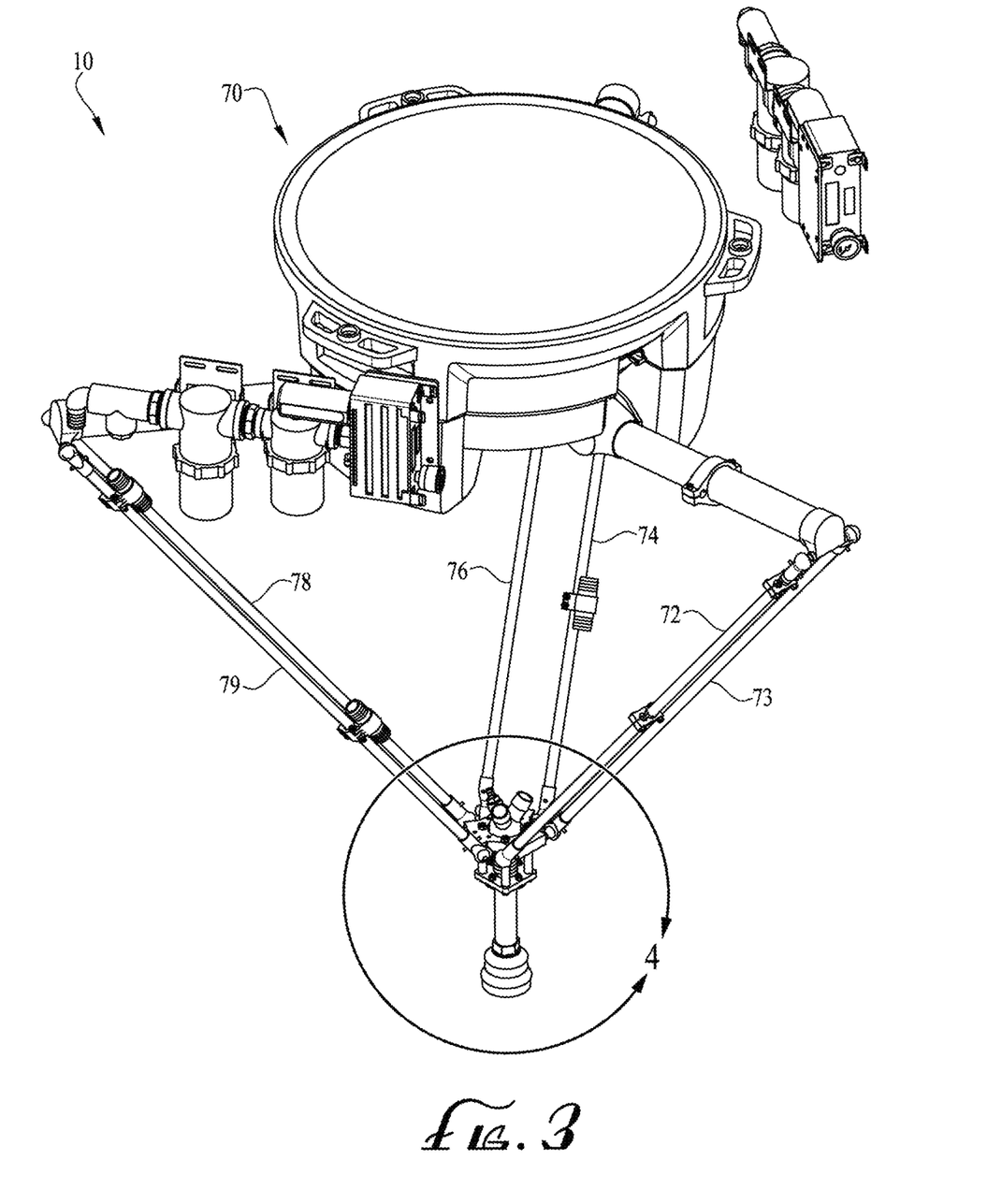
FIG. 3 is a top isometric view of the system of FIG. 2.

FIG. 1 is a schematic of a pneumatically-powered vacuum sorting system 10 according to a first embodiment with FIGS. 2-3 being isometric views of the system of FIG. 1 integrated into a robotic arm system. The system 10 is shown as in FIGS. 2-3 to comprise a robotic arm system including a controller 70, an item detection device/system 71 (e.g., a vision system or means for detecting) to see/detect the materials being transferred along the conveyor 5, and artificial intelligence system to think and identify target objects to be sorted. The robotic arm system comprises a plurality of pairs of robotic arms 74, 76 and 72, 73, and 78, 79. Via the robotic arms 74, 76 and 72, 73, and 78, 79, the controller 70 is operative to move and position the suction head 50 in three dimensions to seek out and engage a selected target object, such as a plastic bottle 120 from a stream of objects being conveyed through a target zone via a conveyor 5.

The system 10 may be described as a vacuum pick-up apparatus that includes a specially designed grasping mechanism/end effector, shown as a flexible suction cup unit 100 disposed on the distal end of a tube or pipe section 60 at the bottom of the suction head 50. The suction cup unit 100 is specially designed to provide a high vacuum air flow capacity as will be described further below.

The system 10 is provided with high air flow vacuum pump system (comprising the means to applying a high subsonic vacuum air flow). To meet a desired high vacuum air flow, the system 10 may be constructed with a dual vacuum pump system comprised of a first vacuum pump 12 and a second vacuum pump 32 disposed in parallel. The first vacuum pump 12 is connected via a first flexible hose 18 drawing air through the flexible hose 18 and through a filter 16 and exhausting out through exhaust 14. The flexible hose 18 is connected via a hose barb 19 to a rigid hose 20 which in turn is connected via a second hose barb 21 to a second flexible hose section 22. The second flexible hose section 22 is then connected to vacuum connector/port 54 of the wye connector 52.

Similarly, on the other side, the second vacuum pump 32 is connected via a second flexible hose 38 drawing air through the second flexible hose 38 and through a filter 36 and exhausting out through exhaust 34. The second flexible hose 38 is connected via a hose barb 39 to a rigid hose 40 which in turn is connected via a second hose barb 41 to a second flexible hose section 42. The second flexible hose section 42 is then connected to vacuum connector/port 56 of the wye connector 52.

Figure 4:
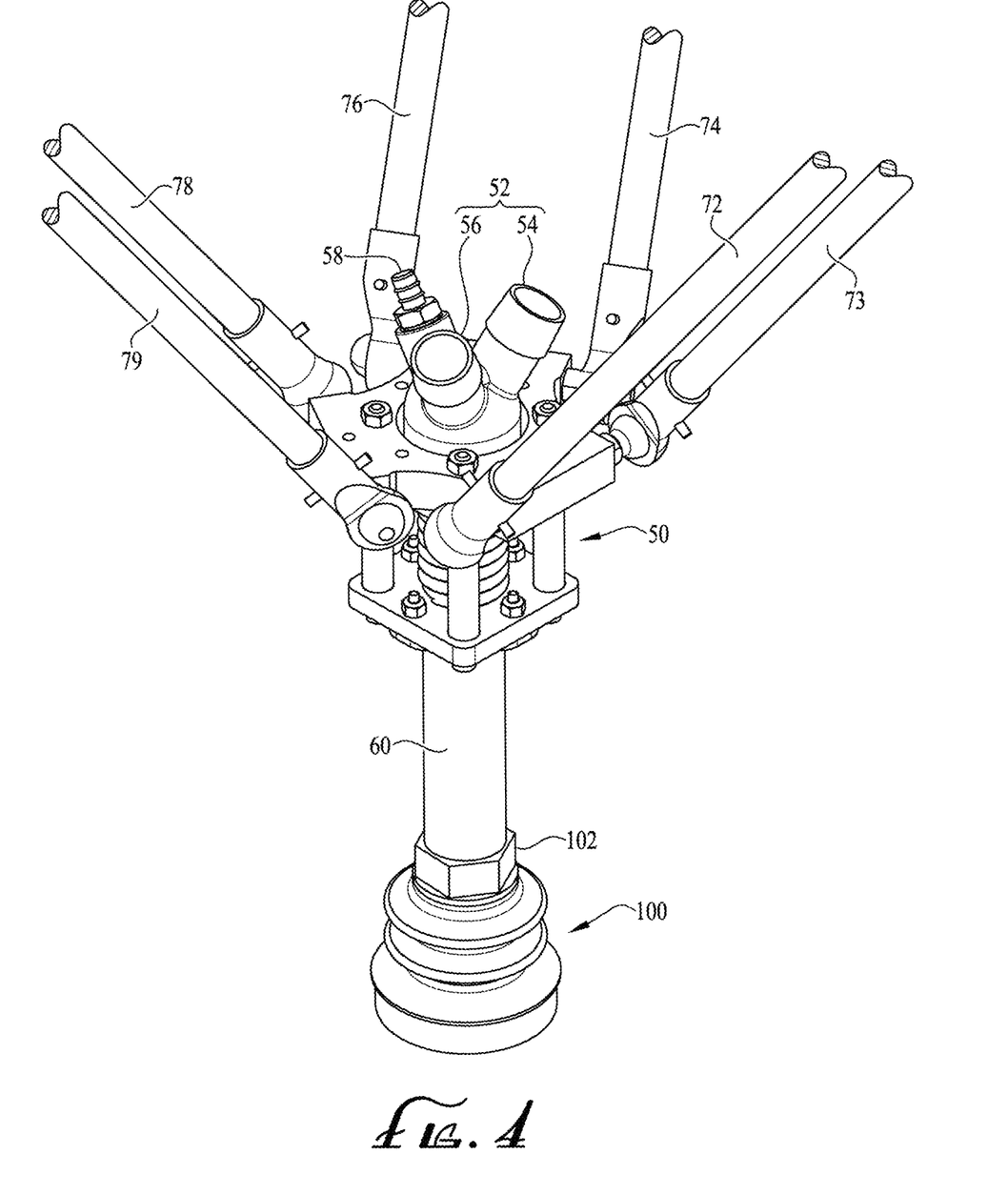
FIG. 4 is an enlarged isometric view of the vacuum head section of the sorting system of FIGS. 2-3.
Figure 5:
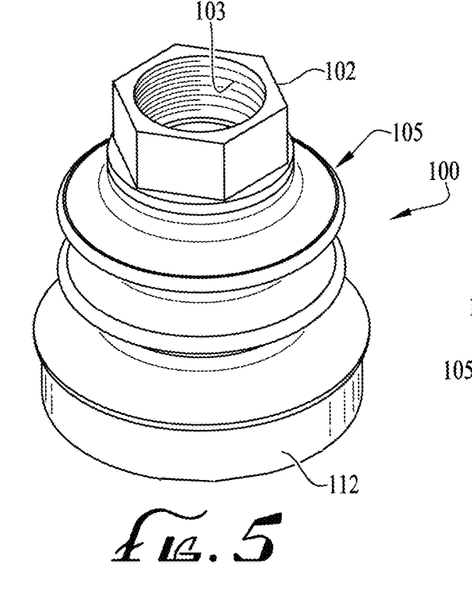
FIG. 5 is an isometric view of a suction cup according to an embodiment.
Figure 6:
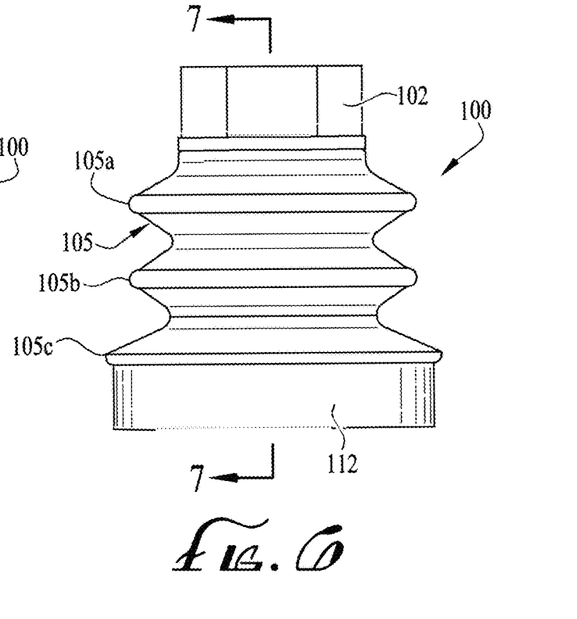
FIG. 6 is a front elevation view of the suction cup of FIG. 5.

The wye connector 52 is a multi-port connector/manifold which is shown in FIG. 4 as having the two vacuum line connectors/ports 54, 56 and a blower connector/port 57. The connectors 54, 56 and 57 (collectively comprising a multi-port distribution manifold) all provide for an open fluid connection for air flow through suction head 50 to the lower pipe section 60. The suction cup unit 100 is connected to the end of the lower pipe section 60 via a threaded fitting or connector 102 attached to the top section of the suction cup unit 100. The blower connector 57 is connected via a flexible hose 58 to a pressure source 59 such as an air blower or compressed air source. The pressure source 59, flexible hose 58 and blower connector/port 57 are optional components, but may provide for enhanced releasing force for the object being grabbed.

Alternately, the vacuum air flow may be provided by a single vacuum pump, three (or more) vacuum pumps, or another suitable vacuum source or sources. It is noted that a vacuum pump may comprise any suitable device that draws a vacuum, such as a positive displacement vacuum pump, liquid ring vacuum pump, momentum transfer vacuum pump, regenerative vacuum pump, a venturi vacuum pump, or other. Following is an example method of grasping items, comprising the steps of:

detecting, via a vision recognition system, a target object to be grasped from a stream of objects being moved on a conveyor.
  using the robotic arms 72-79 of the system 10 to position the suction head 50 (and the suction cup unit 100) over or onto an object 120 identified by the vision recognition system to be sorted.
  activating the vacuum pressure (vacuum pumps 12, 32) to apply a vacuum lifting force into the suction cup unit 100 for grasping the object 120.
  using the robotic arms 72-79 to lift the object 120 and move it over a bin or desired sorting location.
  discontinuing the vacuum pressure (and thus deactivating the lifting force) being applied and dropping/depositing the object 120 into the bin or other desired sorting location.
  optionally applying positive pressure (by the pressure source 59) through the suction cup unit 100 to assist in releasing the object 120. The positive pressure provides a positive releasing force on the object 120. When the vacuum force is being applied by the vacuum pumps 12, 32, the pressure source 59 is disconnected/isolated, to allow the vacuum grasping force to be applied through the suction cup unit 100.

As described below, in one embodiment, the vacuum pump system is operable for applying a high vacuum flow rate of at least 60 scfm (standard cubic feet per minute) through the suction cup unit 100 of the suction head 50 when the pick-up apparatus is free from grasping a target object (i.e., no item is being grasped by the suction cup unit 100).

FIGS. 5-8 illustrate details of an example suction cup unit 100 according to a first embodiment. The suction cup unit 100 is comprised of a flexible cup section 105 and a connector (inlet section) 102. The connector 102 includes internal female threads 103 (NPT) for connecting to a male-threaded end of the lower pipe section 60 (of FIGS. 1-4). A flexible suction cup 105 is attached to the bottom portion of the connector 102. The example flexible cup section 105 is formed with multiple bellows sections, with the example in FIGS. 5-8 having a first bellow 105a and a second bellow 105b and a suction cup lower lip 105c. Alternatively the flexible suction cup section 105 may be formed with a different number of bellows such as a single bellow, or three or four bellows, or more bellows.

Figure 7:
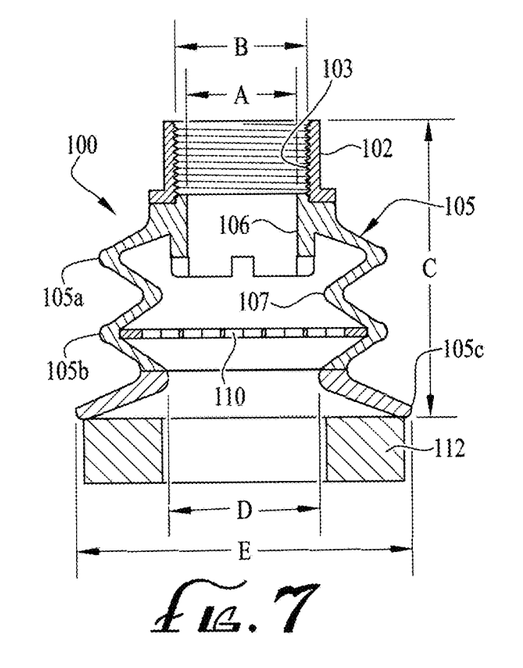
FIG. 7 is a cross-sectional view of the suction cup of FIG. 6 taken along line 7-7.

A cup screen element 110 is optionally provided and disposed within the flexible cup section 105, as shown in FIG. 7 disposed in the second bellow 105b. The screen 110 may be alternatively disposed in another suitable location.

The screen 110, which may be replaceable, may be integrated into the flexible cup section 105. The screen 110 is sized for the screening of materials of a desired size that are small enough or pliable enough to be suctioned into an inner chamber 107 of the flexible cup section 105, but are of such a size (or type, e.g., pliable) that would obstruct the vacuum system. The design of the screen 110 (e.g., the size of the hexagonal openings) is such as to maintain adequate (high) vacuum air flow and not become clogged by dirt and debris while promoting the full grasping functionality. Likewise, miscellaneous smaller items of certain size that are not targeted, but are in the target area, are screened by the screen 110 such that the flexible cup section 105 and any subsequent vacuum hoses 18, 38 do not become clogged with foreign objects, while particles of a given small size (that will not obstruct the vacuum system) are allowed to pass through the screen opening without clogging the screen 110 itself. The screen is sized to have openings large enough to avoid disrupting the high vacuum flow rate but small enough to screen undesirably large (or alternately pliable) items from passing through the suction head. The optional pressure source 59 may optionally assist in removing miscellaneous items trapped by the screen 110, blowing those items back out of the suction cup unit 100.

Figure 8:
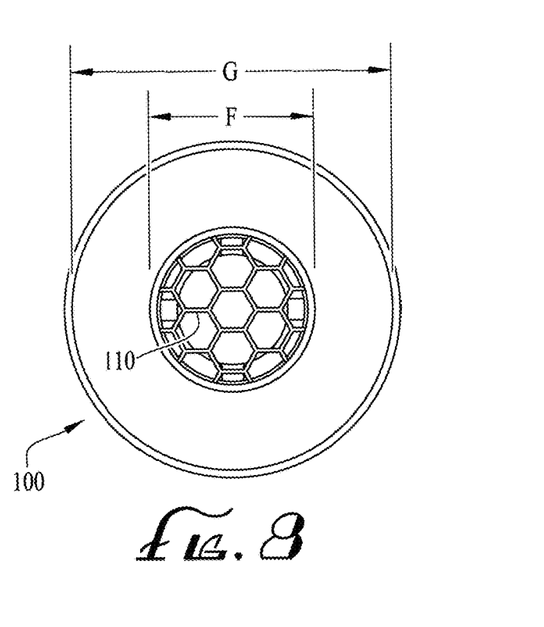
FIG. 8 is a bottom plan view of the suction cup of FIGS. 5-7.
Figure 9:
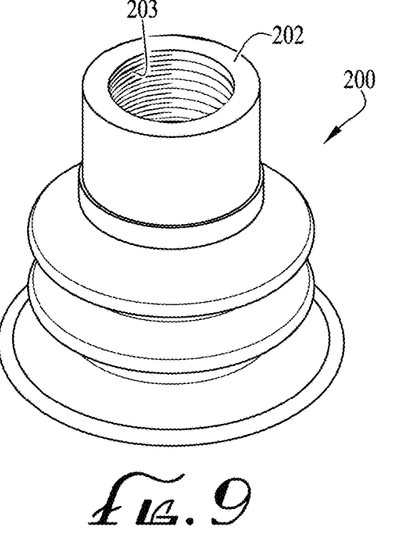
FIG. 9 is an isometric view of a suction cup according to another embodiment.
Figure 10:
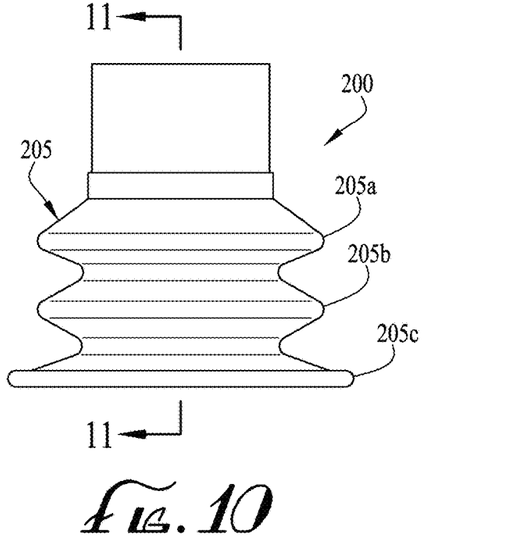
FIG. 10 is a front elevation view of the suction cup of FIG. 9.
Figure 11:
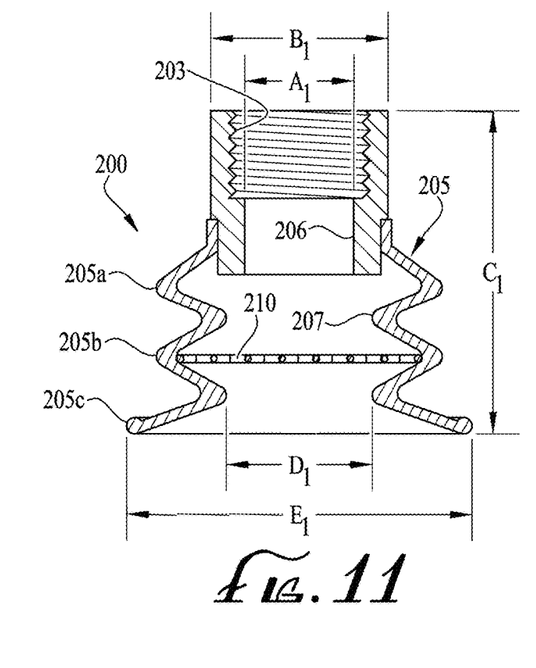
FIG. 11 is a cross-sectional view of the suction cup of FIG. 10 taken along line 11-11.
Figure 12:
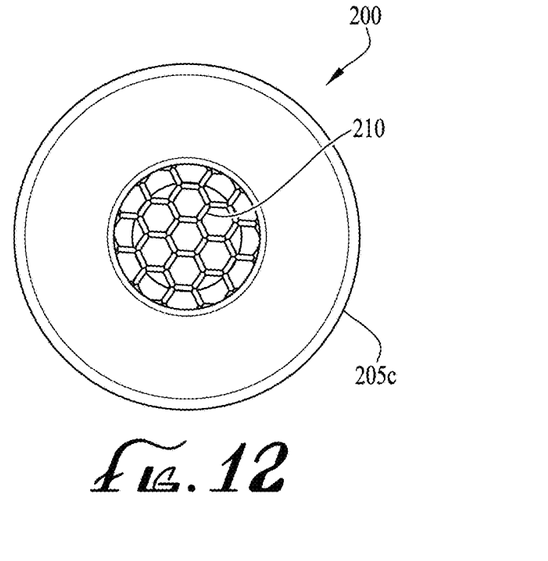
FIG. 12 is a bottom plan view of the suction cup of FIGS. 9-11.

The optional foam lip unit 112 (of FIGS. 5-8) may be constructed of a suitable flexible (e.g., polymer) material such as open cell foam (e.g., polyurethane open cell foam). The foam lip unit 112 is shown formed as a cylindrical, donut-shaped form having (as shown in FIG. 8) an internal opening of a diameter F and an outer diameter G. The foam lip unit 112 is attached to the bottom of the flexible cup section 105 (i.e., to the lower cup lip 105c) via an adhesive or other suitable attachment mechanism. The optional foam lip adhesive (or other attachment mechanism) may be selected to allow for the foam lip to be removably attachable (i.e., replaceable), thereby being replaced easily without damaging or replacing the cup section.

The dual vacuum pumps 12, 32 connected to respective vacuum connectors 54, 56 combine to provide for a desired high vacuum air flow through lower pipe section 60 and the inner chamber 107 of the flexible cup section 105.

FIGS. 9-12 illustrate an alternative suction cup unit 200 according to a second embodiment comprised of a flexible cup section 205 and an inlet/connector 202. The connector 202 includes internal female threads 203 (NPT) for connecting to a corresponding male threaded end of the pipe section 60 (of FIGS. 1-4). The flexible cup section 205 attaches to the bottom portion of the connector 202. The flexible cup section 205 is similar to the prior embodiment of the flexible cup section 105 and includes two bellows 205a and 205b and a lower lip 205c. Unlike the prior embodiment, suction cup unit 200 is illustrated without the optional foam lip element whereby contact with the object 120 (shown as a plastic bottle) is made directly by the lower lip 205c. A high flow screen 210 is shown integrated within an internal chamber 207 of the lower bellow 205b the screen operating as described in the previous embodiment.

The flexible cup sections 105, 205 may be made of a suitable flexible material such as a flexible polymer material, e.g. polyurethane, or combinations thereof.

The design of the suction cup units may be directed to vacuum handling, that is, to create a low pressure to generate lift and holding force. In an example scenario with the suction cup positioned above the object, this lifting and holding force is accomplished by creating contact with the object and evacuating the air from above the contact area of the object. In order to achieve the vacuum, more air should be evacuated through the suction cup than is leaked through the area of contact. The design of certain embodiments described herein may function by optimizing these two aspects.

First, sealing the object and minimizing leaks into the vacuum chamber is fundamentally achieved by promoting maximum compliance of the suction cup to the surface of the object. The suction cup may be configured to be pressed against the target item without requirement of preserving the condition of the item. A multi-bellow design may allow the flexible cup section to articulate and align to non-orthogonal surfaces. In suction cup unit 200, the soft lip 205c that forms the base of suction cup unit 200 is flexible so that it can conform to ridges on the object 120. Alternately, the optional foam unit 112 (shown attached to the bottom of the suction cup unit 100 of FIGS. 5-8) may be used at the point of contact to close off the smaller air gaps resulting from more subtle and complex variations in the surface of the object 120 (e.g., a plastic bottle) being grasped. Similarly, without the optional foam unit 112, the soft lip 105c (of the suction cup unit 100) is flexible so that it can conform to ridges on the object 120.

Second, the bore of the suction cup unit 100,200 is optimized to allow adequate (high) vacuum air flow. This high vacuum air flow capacity of the suction cup is provided to generate sufficient lift force when targeting objects with highly irregular surfaces, even porous surfaces or those containing hole(s) can be grasped. The high vacuum air flow also increases the rate of vacuum creation, which increases the speed in which an object is grasped.

The relative size of the flow opening area (determined by diameter $A, A_1$ inlet flow opening 106,206) versus the area of the cup opening (determined by diameter $D, D_1$ of flexible cup section internal opening 107,207) may be designed to maximize the lifting force for the application of grasping items of different/indeterminate size and shape. Suction/lifting force is a function of two variables: area and pressure. If the suction cup opening area (determined by diameter $D, D_1$) is too large, air may not be evacuated fast enough to create the pressure differential needed to produce adequate lifting force. If the suction cup lip area is too small, a large enough lifting force might not be applied for larger/heavier object no matter what the pressure differential. As described herein, the suction cup opening area refers to the area determined by the inner diameter $D, D_1$ of the flexible cup section 105,205.

The suction cups employing smaller openings attempt to be as efficient as possible (i.e., lowest power consumption) and employ smaller flow openings (on the order of ½ inch or smaller) according to a lower flow rate (about 10 scfm, or at most 40 scfm) (scfm=standard cubic feet per minute) and thus can only efficiently/consistently pick up smooth surface objects. Further, the flow rate through the smaller cup opening is limited, that is, the smaller ½ inch opening suction cup cannot achieve a higher flow rate, no matter the vacuum pressure applied, due to limitations allowed by air speed from subsonic to supersonic as choked flow ensues.

In contrast to other systems employing smaller openings and lower flow rates, certain embodiments described herein may provide a higher desired flow rate, e.g., a high subsonic vacuum air flow rate of at least 60 scfm, or in a range of 60 scfm to 120 scfm, during free flow when the pick-up apparatus is free from grasping a target object (i.e., no item is being grasped by the suction cup 100,200) which is achievable through the larger flow opening area (determined by $A, A_1$) and with a ratio of inlet flow opening area to flexible cup section opening area (A/D; $A_1/D_1$) of at least 0.46, or between 0.36 and 1.44, or between 0.46 and 1.15. Further, in one example, the flow opening area is such that the minimum flow rate (60 scfm) does not produce a ratio of volumetric flow rate to area which exceeds Mach 0.2, under standard conditions for temperature and pressure.

Figure 22A:
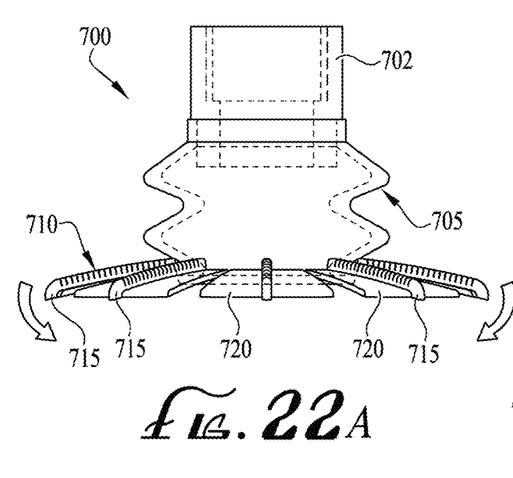
FIG. 22A is a front elevation view of an alternate suction cup having a suction cup lip formed with radial sections fitted with pressurized veins, the radial sections shown in a first position.
Figure 22B:
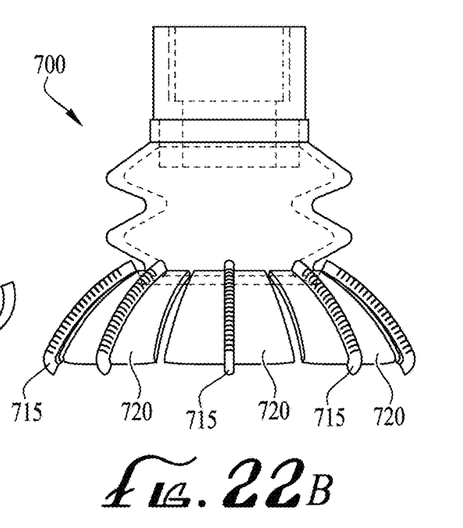
FIG. 22B is a front elevation view of the suction cup of FIG. 22A with the radial sections shown in a second position.

As noted, in order to create a lower pressure, more air should be evacuated than is leaked into the cavity of the suction cup. Supplemental methods/systems for closing off the gaps responsible for air leakage are envisioned. FIGS. 22A-B illustrate an embodiment of such a method/system comprising an alternate suction cup unit 700 is comprised of a flexible cup section 705 and a connector (inlet section) 702 similar to the prior described embodiments. The suction cup unit 700 includes a suction cup lip 710 that is formed with a plurality of radial segments 720 that are fitted with veins 715 that, when filled with pressurized air, cause elongation of a corrugated top surface while the structure of the lower surface resists elongation. As a result, there is a moment force (bending moment) that will control concavity of the flexible lip section and force the lip of the suction cup to conform more closely to the irregular surfaces of the target object.

FIG. 22A illustrates the veins 715 in the non-pressurized state whereby the radial segments 720 are arranged in a first position with a relatively flat concavity. FIG. 22B illustrates the veins in a pressurized state applying the bending moment to move the radial segments into second position of a greater concavity. This design may be operable to further close off air gaps and increase the lifting force generated by a given vacuum source, allowing better suction cup performance on a wider range of irregularly-shaped target objects.

Table A below provides vacuum pump data for an example vacuum pump suitable for use in the present system, the pump being a model piClassic available from Piab USA, Inc. of Hingham, Massachusetts.

TABLE A

| Vacuum Pump | |
|---|---|
| Vac Pump | piClassic |
| Cartridges | si32-3 × 6 |
| V-Flow, inHG | Vacuum Flow SCFM |
| 0 | 61.00 |
| 3 | 37.90 |
| 6 | 31.40 |
| 9 | 21.60 |
| 12 | 11.40 |
| 15 | 7.63 |
| 22.1 | 0 |

The vacuum pump may provide a relatively high vacuum level such as at least 16 inHG at zero air flow. To further accommodate the higher air flow rate, in an embodiment, the supply lines 18-22, 38-42 and 60 also have large (internal) diameter.

Figure 13:
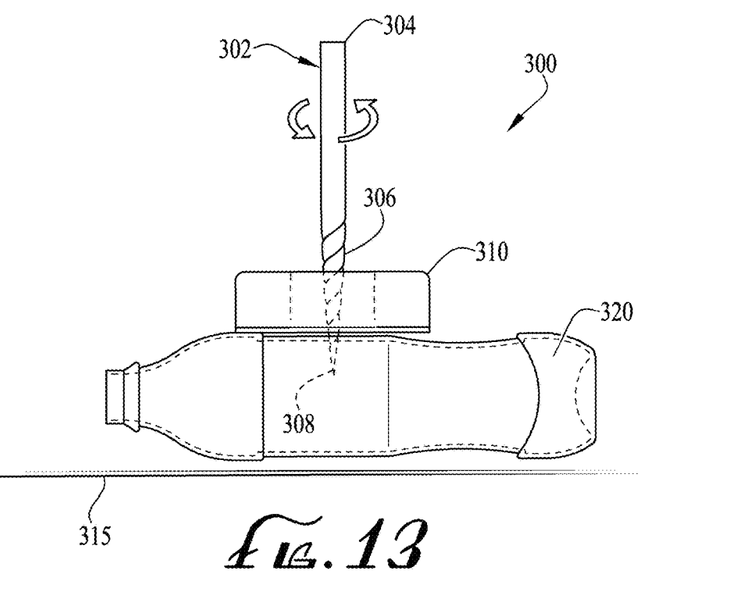
FIGS. 13-14 are diagrammatic views of an alternate object grasping head according to an embodiment using a piercing mechanism.
Figure 14:
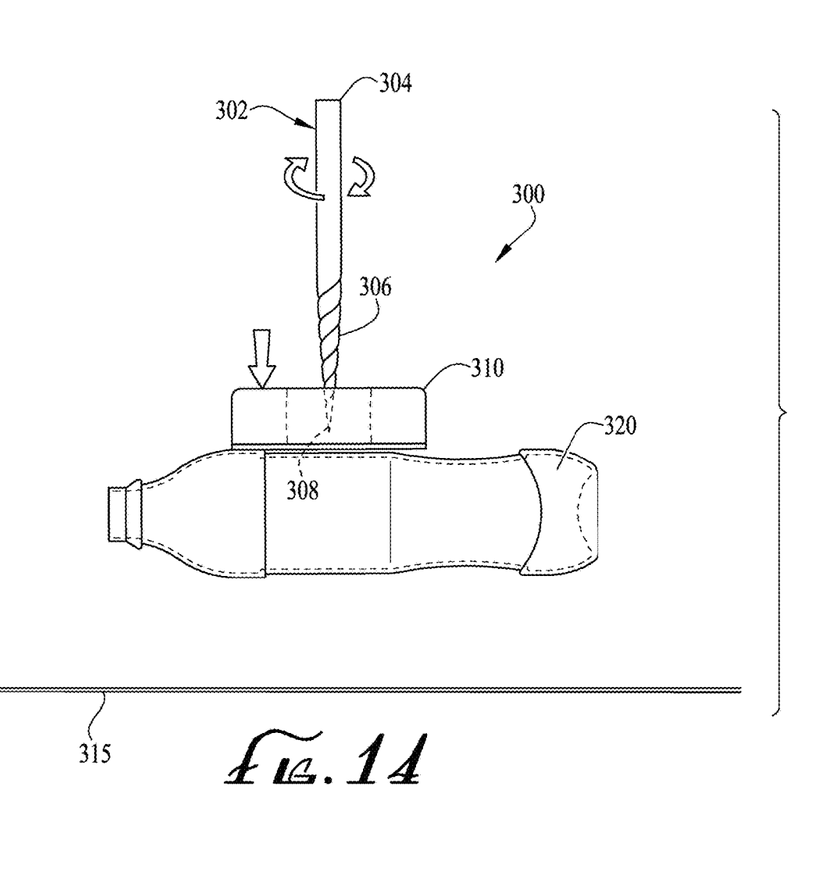

As a supplement (i.e., in conjunction with) or stand-alone, the grasping mechanism may comprise a mechanical device that pierces target objects to control and manipulate them. One such application of this design includes three primary features; a pointed flute/spike, an object contactor, and a ridged work surface. FIGS. 13-14 are diagrammatic views of an alternate object grasping mechanism according to an embodiment using a piercing mechanism and part stop (object contactor). As shown in FIG. 13, a target object 320, shown as for example a plastic bottle, is pinned between a weighted part stop 310 and a conveyor 315 (or optionally ridged work surface). In this state, movement (e.g., axial rotation) of the object 320 is constrained allowing a flute/spike 302 to penetrate the object 320. The flute 302 embeds in such a way that little or no material is removed from the object 320 and once inserted frictional forces allow manipulation of the object 320.

In one embodiment, the flute 302 includes a proximal end 304 attached to a drive/support mechanism of a robotic arm (as in a prior embodiment), a pointed distal end 308 for piercing the object 320, and a knurled or threaded end section 306 extending from the center to the pointed distal end 308. While the object 320 is pinned against the work surface 315, the flute 302 may be inserted into the object 320, the pointed distal end 308 piercing the wall of the object. The end section 306 may optionally comprise a spiral thread or threaded knurl section, and the flute 302 may then be axially rotated (in a first direction) during insertion into the object 320. Once inserted, the end section 306 provides a friction connection enabling the object to be lifted off the work surface 315 (and held against the part stop 310) and manipulated to a desired position for ejection. To eject or deposit the object 320, as shown in FIG. 14, the flute 302 is retracted into the part stop 310 whereby the object 320 falls by gravity into a sorting bin or other location. Optionally, the flute 302 may be counter-rotated (axially rotated in a second/opposite direction) during retraction in the embodiment where the flute 302 includes a spiral (e.g., a high pitch helix thread) or threaded knurl. FIG. 14 shows the process for releasing the object, where the part stop 310 applies a force to the object 320 and the (threaded) flute 302 reverses rotation and draws out of the object, thereby releasing the impaled object 320.

Figure 15:
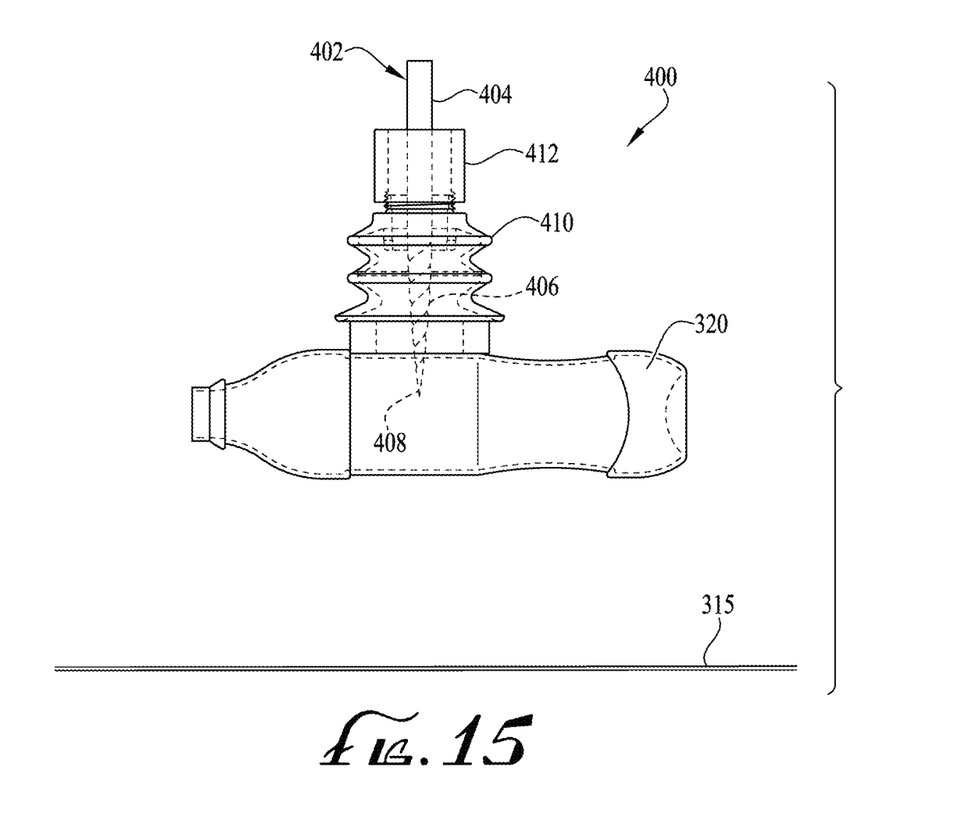
FIG. 15 is a diagrammatic view of an alternate object grasping head according to an embodiment using a combination suction head and piercing mechanism.

FIG. 15 is a diagrammatic view of an alternate grasping mechanism 400 of a combination mechanical piercing mechanism (or impaling device) 402 (similar to the piercing mechanism 302 as in FIGS. 13-14) and (high flow) suction cup 410 (similar to the suction cup 100 as in FIGS. 5-8 or the suction cup unit 200 as in FIGS. 9-12). FIG. 15 shows the piercing mechanism 402 paired with a high flow suction cup 410, in this embodiment, the piercing mechanism (shown as a pierced spike) 404 includes a proximate end section 404, a knurled or spiral flute insertion section 406 and a pointed distal end 408. The pierced spike 404 supplements the holding force of the vacuum applied by the suction cup 410 and adds shear resistance (via the knurled/spiral flute insertion section 406) to the object 320 which may allow for higher acceleration and faster transport of the object 320 from the conveyor 315.

Figure 16:
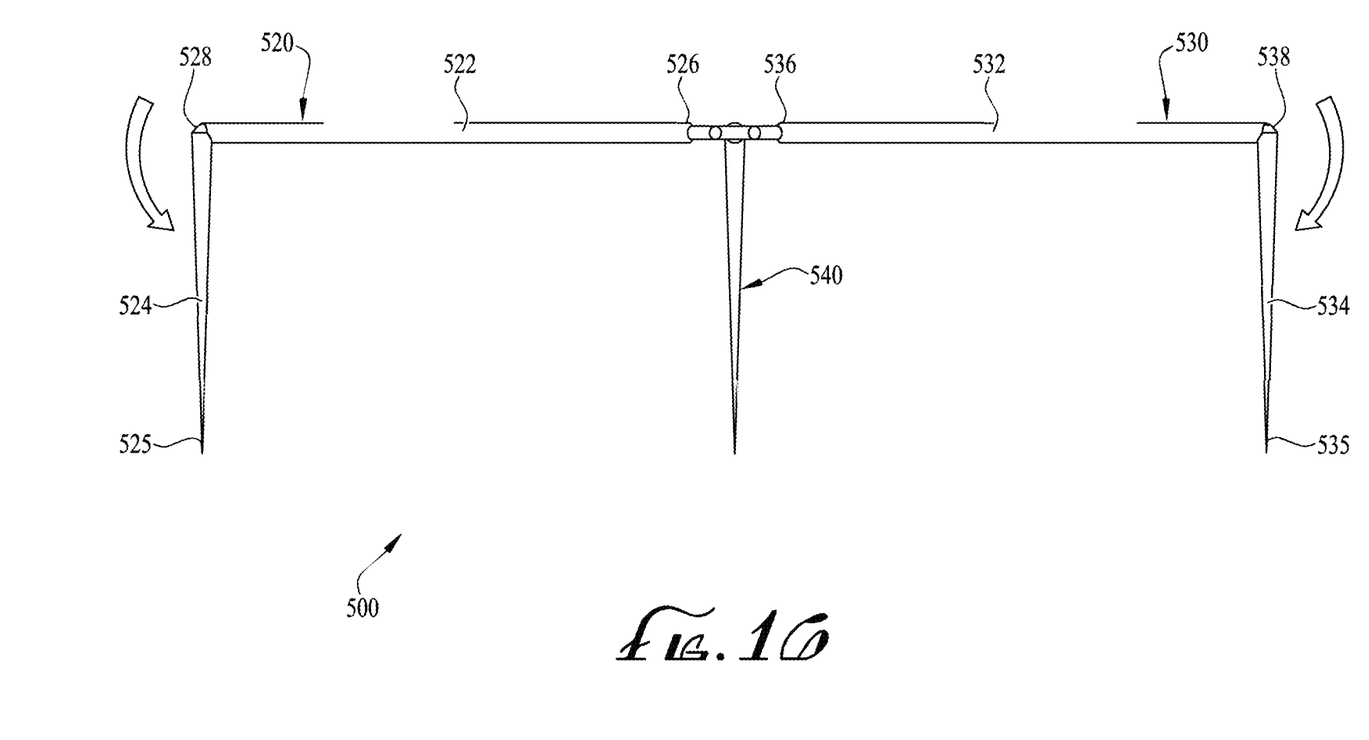
FIG. 16 is a diagrammatic front view of an alternate object grasping head including a mechanical grasping prong, the prongs being in the open, non-grasping position.
Figures 17, 18:
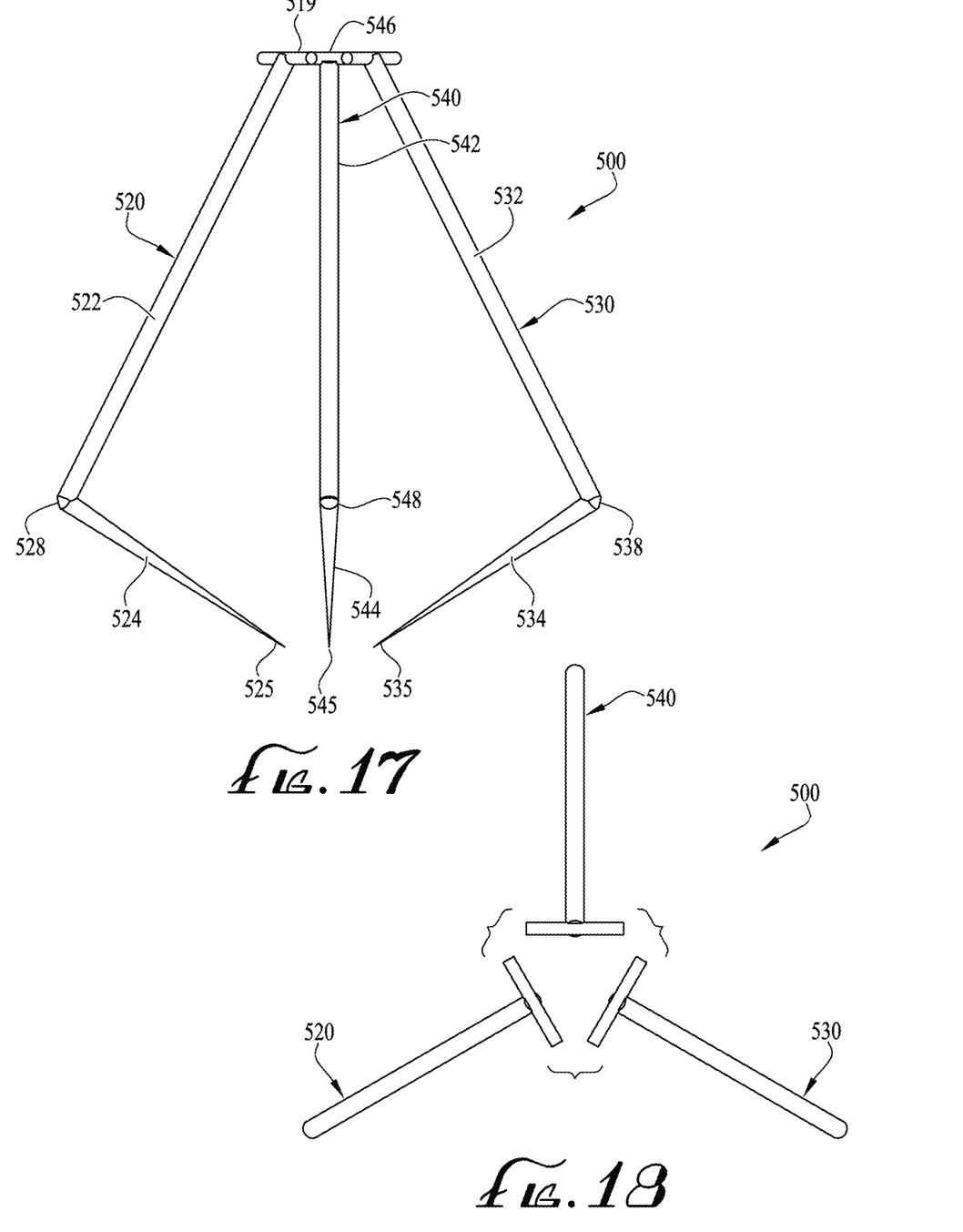
FIG. 17 is a diagrammatic front view of the grasping head of FIG. 16 with the prongs being in the closed, grasping position.
FIG. 18 is a diagrammatic top view of the grasping head of FIG. 17.

FIGS. 16-18 illustrate a system of manipulating an object or group of objects with the use of a finger-like/arm mechanism 500 actuating/pivoting in swinging manner to pinch, pierce and/or cradle the object. The arm mechanism 500 includes three arm units 520, 530, 540 arranged/spaced at 120° around the cup mechanism 510. The first arm unit 520 includes a first arm section 522 and a second arm section 524, a first elbow/hinge 526 for allowing articulation/pivoting between the first arm section 522 and the support plate 519, and a second elbow 528 (optionally a hinge allowing articulation/pivoting) connecting the first arm section 522 and the second arm section 524. The second arm section 524 is shown having a pointed distal end 525 for allowing a point or piercing contact with the object. The second arm unit 530 includes a first arm section 532 and a second arm section 534, a first elbow/hinge 536 for allowing articulation/pivoting between the first arm section 532 and the support plate 519, and a second elbow 538 (optionally a hinge for allowing articulation/pivoting) connecting the first arm section 532 and the second arm section 534. The second arm section 534 is shown having a pointed distal end 535 for allowing a point or piercing contact with the object. The third arm unit 540 includes a first arm section 542 and a second arm section 544, a first elbow/hinge 546 for allowing articulation/pivoting between the first arm section 542 and the support plate 519, and a second elbow 548 (optionally a hinge for allowing articulation/pivoting) connecting the first arm section 542 and the second arm section 544. The second arm section 544 is shown having a pointed distal end 545 for allowing a point or piercing contact with the object. The arm units 520, 530, 540 are arranged and separated at 120° from each other so as to grasp the object in a suitable pinching motion. Releasing the object is achieved by forcing/moving the arms back to the open position. Grasping and handling of the object may be done without regard for the preservation of the target object.

Figure 19:
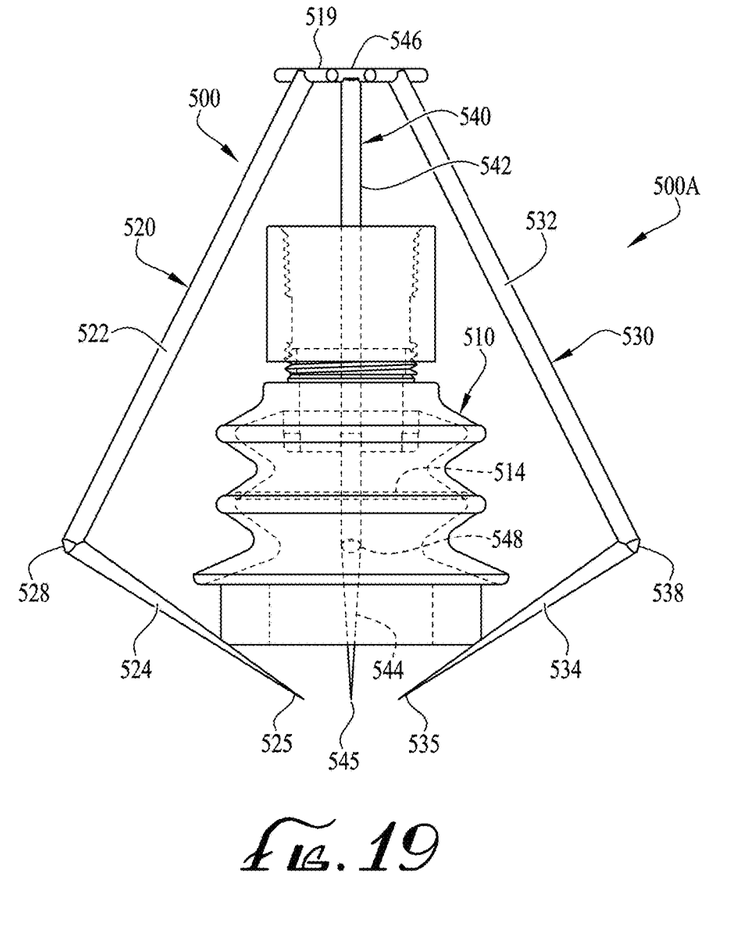
FIG. 19 is a diagrammatic front view of an alternate object grasping head including a combination suction head with mechanical grasping prongs of FIGS. 16-18.

FIG. 19 depicts a combination system 500A including both the arm mechanism 500 (of FIGS. 16-18) paired with a high flow vacuum cup mechanism 510 with an internal screen 514 (such as the cup mechanisms described in certain prior embodiments).

Figure 20A:
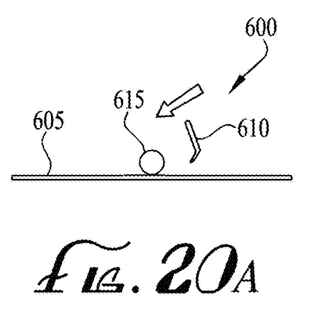
FIGS. 20A, 20B, 20C illustrate another alternate system for manipulating objects.
Figure 20B:
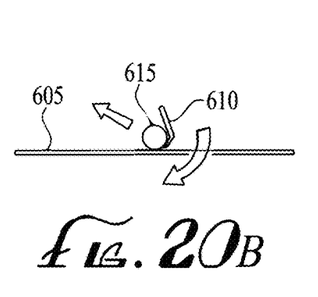
Figure 20C:
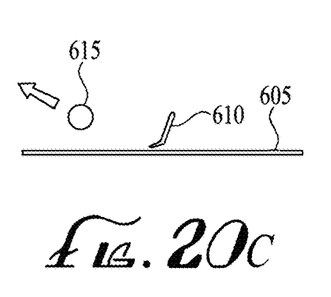

FIGS. 20A-C illustrate a mechanism 600 for relocating or manipulating objects (such as target object 615) in a given space by means of impact, flipping, or nudging the target object, or group of objects being moved along a conveyor 605. This object relocation is achieved without the need for directly grasping the object. FIGS. 20A-C show one such embodiment operating via a precisely directed high-speed impact of a moving/impacting element 610 onto the target object 615, thus generating sufficient kinetic energy to displace the target object from its original position to a new desired location. A similar method is envisioned as a second application, by contacting the object at a synchronous speed and accelerating in such a manner to flip the target object to a new location.

Figures 21A, 21B:
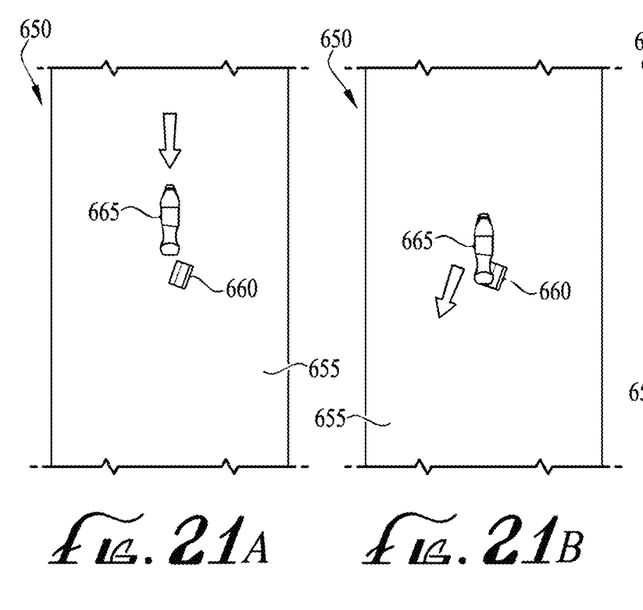
FIGS. 21A, 21B, 21C illustrate another alternate system for manipulating objects.
Figure 21C:
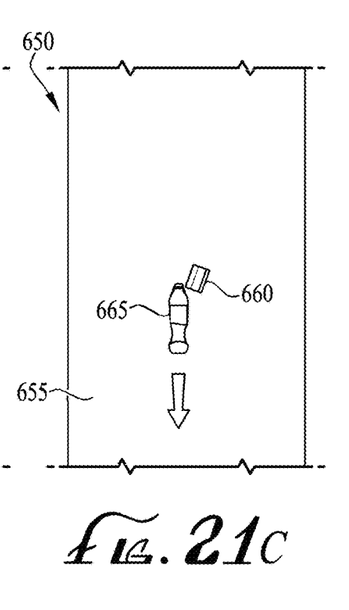

FIGS. 21A-C illustrate another embodiment for manipulating objects comprising a system/method for nudging a moving target object 665 off its current trajectory (being moved along via a conveyor 655), resulting in a two dimensional displacement of the object 665. This nudging may be achieved using a stationary or relatively slow-moving rigid body 660 to deflect the moving target object 665 off its current trajectory, relocating it in space. This methodology may be applied to the object 665 more than once, or until the desired final position is satisfied. This process of multiple, slight (incremental) deflections may provide a cumulative effect of segregating desired materials from their original co-mingled stream of miscellaneous objects.

Other embodiments are envisioned. Although the description above contains certain specific details, these details should not be construed as limiting the scope of the invention, but as merely providing illustrations of some embodiments/examples. It should be understood that subject matter disclosed in one portion herein can be combined with the subject matter of one or more of other portions herein as long as such combinations are not mutually exclusive or inoperable.

The terms and descriptions used herein are set forth by way of illustration only and not meant as limitations. It will be obvious to those having skill in the art that many changes may be made to the details of the above-described embodiments without departing from the underlying principles of the inventions.

The invention claimed is:

1. A vacuum pick-up apparatus usable in a material handling system, the vacuum pick-up apparatus comprising:
   a vacuum pump system operable for applying a vacuum air flow; and
   a suction head including a flexible suction cup, the suction head operably coupled to the vacuum pump system and receiving the vacuum air flow from the vacuum pump system, wherein the flexible suction cup includes a flexible lip at a distal end thereof having a top surface and an opposite object-contacting bottom surface, the flexible lip including a plurality of offset radial segments disposed on the top surface thereof, wherein concavity of the flexible lip is actively controlled through application of a moment force to one or more radial segments of the plurality of offset radial segments, and wherein the vacuum air flow passes through the flexible suction cup and draws an object into contact with the flexible suction cup along the object-contacting bottom surface of the flexible lip.

2. The vacuum pick-up apparatus of claim 1, wherein one or more of the radial segments in the plurality of offset radial segments further includes a corresponding vein coupled along a top surface thereof, and wherein pressurization of the vein controls concavity of the flexible lip.

3. The vacuum pick-up apparatus of claim 2, wherein the vein is filled with a pressurized gas to elongate the top surface of each corresponding radial segment while an opposite bottom surface resists elongation, to thereby control concavity of the flexible lip.

4. The vacuum pick-up apparatus of claim 2, wherein each radial segment of the plurality of offset radial segments is in a first position when the corresponding vein is in a non-pressurized state, and wherein each radial segment of the plurality of offset radial segments is in a second position when the corresponding vein is in a pressurized state, the second position having a greater concavity as compared to the first position.

5. The vacuum pick-up apparatus of claim 1, wherein the flexible suction cup includes (a) an inlet section with an inlet flow opening area capable of flowing 60 scfm (standard cubic feet per minute) without an airspeed exceeding Mach 0.2 under standard conditions for temperature and pressure, and (b) a flexible suction cup section having an inner cup opening area such that the ratio of the inlet flow opening area to inner cup opening area is between 0.36 and 1.44.

6. The vacuum pick-up apparatus of claim 5, wherein the vacuum pump system is operable to apply a vacuum air flow of at least 60 scfm through the flexible suction cup when the flexible suction cup is free from grasping a target object.

7. The vacuum pick-up apparatus of claim 1, wherein the flexible suction cup includes a first bellows and a second bellows, the system further comprising a screen disposed within one of the first or second bellows, the screen including a plurality of openings to accommodate the vacuum air flow.

8. The vacuum pick-up apparatus of claim 1, further comprising a mechanical piercing mechanism operable for moving in conjunction with the flexible suction cup, the mechanical piercing mechanism piercing into the object contacting the flexible suction cup to assist in manipulating the object.

9. The vacuum pick-up apparatus of claim 8, wherein the mechanical piercing mechanism is rotatable relative to a rotational axis in a first direction when piercing into the object, and rotatable relative to the rotational axis in a second opposite direction for releasing the object.

10. The vacuum pick-up apparatus of claim 8, further comprising a weighted member axially movable relative to the mechanical piercing mechanism, the weighted member contacting an exterior surface of the object to restrain the object from movement prior to the mechanical piercing mechanism piercing the exterior surface and into the object, wherein the mechanical piercing mechanism retains the exterior surface of the object against the weighted member while the object is manipulated.

11. A method of manipulating and sorting non-uniform objects via a vacuum pick-up apparatus, the method comprising:

moving, via a robotic arm, a suction head into position over a target object, the suction head including a flexible suction cup with a flexible lip at a distal end thereof having a top surface and an opposite object-contacting bottom surface, the flexible lip including a plurality of offset radial segments disposed on the top surface thereof;

applying, via a vacuum pump system, a vacuum air flow through the flexible suction cup to draw the target object into contact with the object-contacting bottom surface of the flexible lip;

controlling a concavity of the flexible lip through application of a moment force to one or more radial segments of the plurality of offset radial segments;

grasping, via the flexible lip, the target object;

moving, via the robotic arm, the suction head and the target object to a target location; and depositing the target object at the target location by discontinuing the vacuum air flow to the flexible suction cup.

12. The method of claim 11, wherein one or more of the radial segments in the plurality of offset radial segments further includes a corresponding vein coupled along a top surface thereof, the method further comprising pressurizing the vein to control the concavity of the flexible lip.

13. The method of claim 12, wherein pressurizing the vein further includes filling the vein with pressurized gas to elongate the top surface of each corresponding radial segment while an opposite bottom surface resists elongation.

14. The method of claim 12, wherein prior to pressurizing the vein, each radial segment of the plurality of offset radial segments is in a first position, and wherein after pressurizing the vein, each radial segment of the plurality of offset radial segments is in a second position, the second position having a greater concavity as compared to the first position.

15. The method of claim 11, wherein the flexible suction cup includes (a) an inlet section with an inlet flow opening area capable of flowing 60 scfm (standard cubic feet per minute) without an airspeed exceeding Mach 0.2 under standard conditions for temperature and pressure, and (b) a flexible suction cup section having an inner cup opening area such that the ratio of the inlet flow opening area to inner cup opening area is between 0.36 and 1.44.

16. The method of claim 15, wherein the vacuum pump system is operable to apply a vacuum air flow of at least 60 scfm through the flexible suction cup when the flexible suction cup is free from grasping a target object.

17. The method of claim 11, wherein the flexible suction cup includes a first bellows and a second bellows, the system further comprising a screen disposed within one of the first or second bellows, the screen including a plurality of openings to accommodate the vacuum air flow.

18. The method of claim 11, further comprising, piercing the target object, via a mechanical piercing mechanism extending through the flexible suction cup, prior to moving the suction head and the target object to the target location.

19. The method of claim 18, further comprising:

rotating the mechanical piercing mechanism in a first direction relative to a rotational axis when piercing the target object; and rotating the mechanical piercing mechanism in a second direction relative to the rotational axis prior to depositing the target object at the target location.

20. The method of claim 18, further comprising a weighted member axially movable relative to the mechanical piercing mechanism, the method further comprising contacting, via the weighted member, the target object to restrain the target object from movement prior to the mechanical piercing mechanism piercing the target object, wherein the mechanical piercing mechanism retains the object against the weighted member while moving the suction head and the target object to the target location.

* * * * *